Dec. 13, 1938.  R. W. WENGEL  2,139,784

MOTION PICTURE CAMERA SUPPLY REEL SPINDLE

Filed Aug. 11, 1936

INVENTOR.
Raymond W. Wengel
BY
George A. Gillett
ATTORNEYS

Patented Dec. 13, 1938

2,139,784

UNITED STATES PATENT OFFICE 2,139,784

MOTION PICTURE CAMERA SUPPLY REEL SPINDLE

Raymond W. Wengel, Rochester, N. Y., assignor, by mesne assignments, to Eastman Kodak Company, Jersey City, N. J., a corporation of New Jersey Application August 11, 1936, Serial No. 95,363

3 Claims. (Cl. 242—55)

This invention relates to motion picture cameras and more particularly to the supply reel spindle of such cameras.

One object of the invention is to provide a spindle of this class which automatically rewinds the overrun film. Another object is to provide a spindle of the class described which maintains an even tension on the roll of film on the supply reel. A further object is to provide such a spindle which is simple in construction, inexpensive to manufacture, and highly effective in use.

To these and other ends, the invention resides in certain improvements and combinations of parts all as will be hereinafter more fully described, the novel features being pointed out in the claims at the end of the specification.

In the drawing.

Similar reference numerals throughout the several views indicate the same parts.

The present inventon is embodied in the present instance, by way of illustration, in a supply reel spindle for motion picture cameras. The preferred form of supply spindle comprises, in general, a hollow spindle member suitably mounted on the side wall of the camera magazine, and a hollow drum-like member rotatably mounted on the hollow spindle adjacent one end thereof. A flat coiled spring is positioned within the hollow drum and has the inner end connected thereto. The outer end of the spring is fastened to a pin formed on a circular disk secured to and rotatable as a unit with the hollow spindle member. This spring thus resiliently connects the drum with the spindle member. A brake is associated with the drum and is arranged to hold the latter when the spindle is started so as to initially wind up or tension the spring. After sufficient torque has been stored up in the spring, the brake slips on the drum to permit the latter to rotate as a unit with the hollow spindle member, the spring providing a resilient connection between the drum and the spindle member. When, however, the spindle is stopped, the brake again grips the drum to hold it against rotation, and thus enables the spring to be released and to reverse the direction of rotation of the spindle to rewind the overrun film back onto the supply reel.

Figure 1:
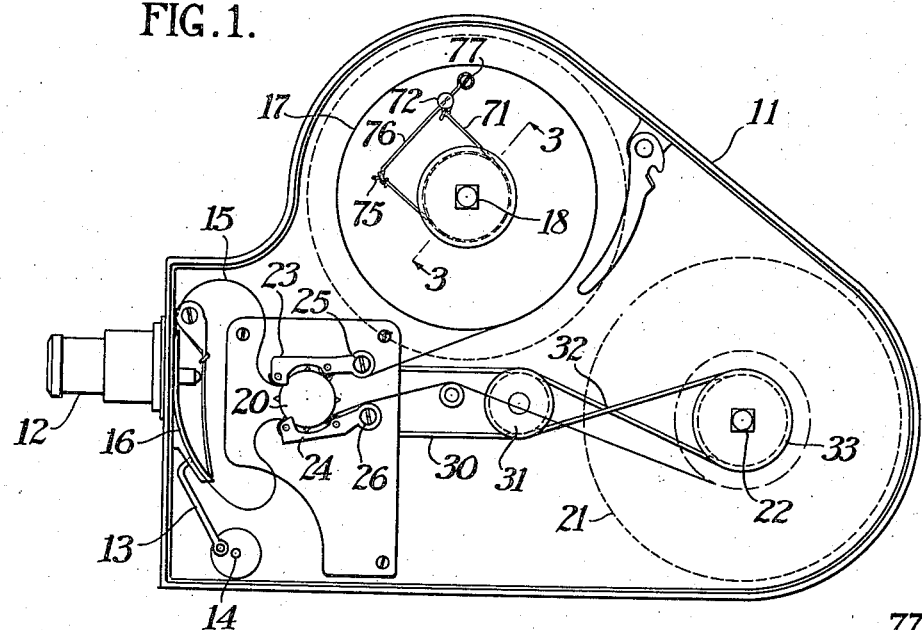
Fig. 1 is a diagrammatic side elevation view of the magazine of a motion picture camera, with the side cover removed, showing a supply spindle constructed in accordance with the preferred embodiment of the invention.

Referring now to the drawing, Fig. 1 shows a film magazine 11 of a motion picture camera, on the front of which is mounted the usual objective 12. The forward portion of the magazine is provided with a pull-down claw 13, of any desired type, eccentrically mounted for rotation on an extension 14 of a motor shaft, and arranged to pull a strip of film 15 through a film gate 16. The film 15 is fed or pulled from a supply reel 17 mounted on a supply spindle generally indicated by the numeral 18, and hereafter more fully described.

From the supply reel 17, the film 15 is pulled over the upper side of a suitable sprocket 20, through the film gate 16, and then back to the under side of the sprocket 20, from whence it is directed to a suitable take-up reel 21 mounted for rotation on the take-up spindle 22, all of which is clearly illustrated in Fig. 1. The film 15 is held in engagement with the sprocket 20 by suitable sprocket gates 23 and 24 which engage the film and maintain it in engagement with the sprocket 20. These sprocket gates 23 and 24 are pivoted at 25 and 26 respectively, so that they may be swung out of engagement with the sprocket 20 to enable the film 15 to be threaded over the sprocket 20, as is well known to those in the art.

The take-up spindle 22, with its reel 21, is preferably rotated by means of a suitable spring belt 30 which is operatively connected to an electric motor (not shown) and runs over a grooved idler wheel 31 and then after crossing over at 32 engages a grooved wheel or disk 33 secured to and rotatable with the take-up spindle 22.

The strip of film 15 is thus pulled or drawn through the entire mechanism by the rotation of the take-up spindle 22 and the pull-down claw 13. As the film is thus pulled, the supply reel 17 revolves to unwind the film thereon. In normal operation, the film 15 is substantially taut on the supply reel due to the pull of the sprocket 20. If, however, the mechanism is suddenly stopped, or the film breaks, the supply reel 17 and its spindle 18, due to their inertia, will continue to revolve or overrun, thus unwinding an excessive amount of film from the supply reel.

The disadvantages of such an arrangement has long been apparent to those in the art; and, in order to overcome this disadvantage, some cameras of this class have been provided with brakes for slowing down and stopping the supply reel so as to reduce the amount of such overrun. It is apparent, however, that while such brakes reduce the extents of such overrun, they still permit a substantial amount of film to be unwound from the supply reel before the latter is actually stopped.

In order to overcome this highly objectionable feature, the present invention provides a new and improved supply spindle construction which permits free rotation of the spindle to unwind the film when the latter is positively pulled by the sprocket 20; but which automatically reverses the rotation of the supply spindle when the film becomes slack to rewind the film thereon. By means of this arrangement, the overrun of the film is prevented, and a constant tension is maintained on the roll of film on the supply spindle.

Figure 2:
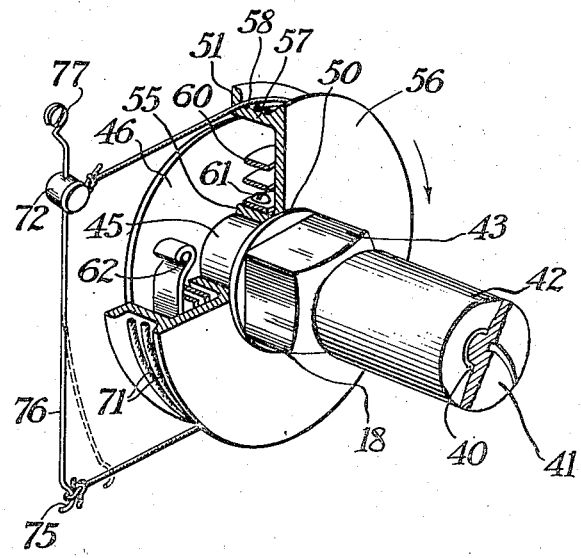
Fig. 2 is a perspective view, partly in section, of the preferred form of supply reel spindle construction, showing the arrangement of the various parts.

Fig. 2 shows a supply reel spindle constructed in accordance with the preferred embodiment of the invention. The supply spindle 18 is preferably of hollow construction and is rotatably mounted on a stud 40 secured to the side wall of the magazine 11, in any suitable or well known manner. The spindle is held in position on the stud by a suitable screw 41, and is shaped at 42 and 43, in the usual manner, to receive the supply reel 17.

Figure 3:
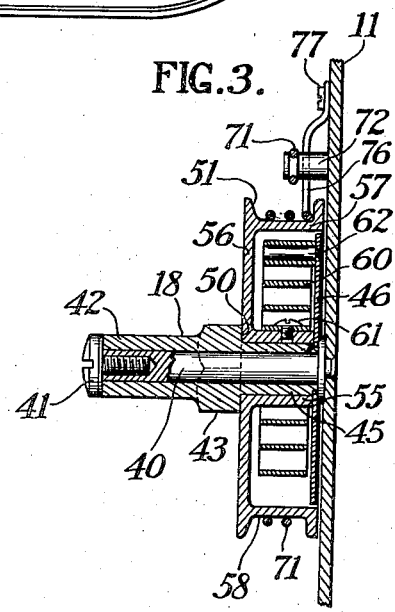
Fig. 3 is a vertical sectional view taken substantially on the line 3—3 of Fig. 1.

The inner end of the spindle is formed, in the present embodiment, with a short cylindrical extension 45, to one end of which is fixed a circular disk 46 adapted to rotate as a unit with the spindle 18. The inner end of the portion 43 is formed with a shoulder 50 which cooperates with the disk 46 to retain a brake drum 51 in position on the extension 45, as clearly illustrated in Figs. 2 and 3. This drum is formed with an axially extending sleeve 55 arranged to rotate freely in the extension 45, and a radial portion 56, the outer edge of which is formed to provide a rim 57 which projects over the peripheral edge of the disk 46. This rim 57 is formed with a groove 58 arranged to receive a brake band which will be later described.

The drum 51 is preferably resiliently connected to the spindle 18 by means of a flexible member preferably in the form of a coil spring 60. The inner end of this spring is suitably secured at 61 to the sleeve 55, and the outer end thereof is fastened to a pin 62 on the disk 46. It is apparent, therefore, that, if the drum 51 is held stationary and the spindle 18 and the disk 46 are rotated in the direction of the arrow, Fig. 2, the pin 62 will carry the outer end of the spring 60 around with the disk 46 and will thus wind up or tension the spring 60. It is also apparent that, after the spring has been thus tensioned and with the drum 51 still held stationary, if the pull of the sprocket 20 is diminished so as to reduce the tension on the film 15, the tension or torque stored up in the spring 60 will cause the spring to unwind or release. This unwinding of the spring will reverse the rotation of the disk 46 and the spindle 18 to rewind any overrun film back onto the supply reel 17. In addition to rewinding the film, the spring 60 also provides a steady reverse pull on the spindle 18 and thus assures proper tension of the film on the supply reel.

In order to hold the drum 51, as above described the present invention provides a novel brake band arranged to engage the bottom of the groove 58 of the drum. This brake band is preferably in the form of a flexible cable 71, one end of which is fastened to a post 72 secured to the side wall of the magazine 11. This cable is then wrapped around the drum 51 one or more times and the free end is then secured to a hook portion 75 on the lower end of a leaf spring 76. This leaf spring is preferably in the form of a flexible wire which extends up through a hole in the post 72 and has the upper end thereof secured to the side wall of the magazine 11 by means of a screw 77. The spring 76 provides the necessary tension for the band or cable 71 and also provides a take-up for any stretch in the cable.

The device operates as follows:

The film is threaded through the machine in the usual manner, and the free end is secured to the take-up reel 21. When the motor is started, the operation of the pull-down claw 13 and the rotation of the take-up spindle 22 pulls or draws the film through the machine and unwinds it from the supply reel. As the supply spindle 18 and the disk 46 are thus rotated by the unwinding of the film from the supply reel 17, the spring 60 is carried around by the disk 46, the drum 51 being held stationary by the friction band 71. The continued rotation of the disk 46 winds up or tensions the spring 60 until the torque developed therein is sufficient to overcome the friction of the band 71, after which the drum 51 rotates as a unit with the disk 46 and the supply spindle 18. If, however, the machine is suddenly stopped, or the tension of the unwinding film is decreased, the torque which is stored up in the spring 60 will automatically and instantly rotate the disk 46 and the spindle 18 in the reverse direction, the drum 51 being then held stationary by the gripping action of the band 71. This reverse rotation will thus rewind any overrun film onto the supply reel.

It will be seen from the above description that the present invention provides a novel supply reel spindle which will not only prevent the overrunning of the film, the disadvantages of which are obvious; but also maintains a constant tension on the film on the supply reel so that the film will also remain tightly wound.

While the present embodiment of the invention has been shown as applied to the supply reel of a motion picture camera, this is by way of illustration only, as it is to be understood that the inventive idea may be carried out in a number of ways. This application is not, therefore, to be limited to the precise details disclosed, but is intended to cover all variations and modifications thereof which fall within the spirit of the invention and the scope of the appended claims.

I claim:

1. In a motion picture apparatus the combination with a support, a spindle rotatably mounted on said support and having a part arranged to receive a supply film reel, a drum loosely mounted on said spindle, a resilient member connecting said spindle and said drum, and a brake band engaging said drum and having one end thereof operatively connected to said support, of a leaf spring secured to said support and having a free end connected to the other end of said brake band to resiliently hold the same in engagement with said drum.

2. In a motion picture apparatus, the combination with a support, a spindle rotatably mounted on said support and having a part arranged to receive a supply film reel, a drum rotatably mounted on said spindle, and a spring connecting said spindle and said drum, of a cantilever spring secured to said support and having a free end, and a non-metallic brake band engaging said drum and having one end connected to said support and the other end connected to the free end of said cantilever spring which is at an angle to the longitudinal axis of said brake band.

3. In a motion picture apparatus, the combination with a support, a spindle rotatably mounted on said support and having a part arranged to receive a supply film reel, a drum rotatably mounted on one end of said spindle adjacent said reel, and a spring connecting said spindle and said drum, of a leaf spring having one end thereof anchored to said support and having a free end, and a brake band in the form of a cord wound in convolutions around said drum and having one end thereof secured to said support adjacent said one end of said leaf spring and having the other end thereof fastened to the free end of said spring.

RAYMOND W. WENGEL.